United States Patent [19]

Wachi et al.

[11] Patent Number: 5,113,598
[45] Date of Patent: May 19, 1992

[54] APPARATUS FOR POWDER FALLING GAS-SOLID CONTACTING OPERATION

[75] Inventors: Shun Wachi, Takasago, Japan; John G. Yates, London, England

[73] Assignee: Kanegafuchi Kagaku Kogyo Kabushiki Kaisha, Osaka, Japan

[21] Appl. No.: 598,306

[22] Filed: Oct. 16, 1990

[30] Foreign Application Priority Data

Aug. 7, 1990 [GB] United Kingdom ............... 9017307

[51] Int. Cl.⁵ .......................................... F26B 17/00
[52] U.S. Cl. ................................... 34/57 A; 34/57 R; 34/10; 110/245; 122/4 D; 432/68; 431/170
[58] Field of Search .............. 34/57 A, 57 R, 10, 168; 110/245, 347, 263; 122/4 D; 422/143; 165/104.16; 432/68; 431/7, 170

[56] References Cited

U.S. PATENT DOCUMENTS

| | | | |
|---|---|---|---|
| 3,091,594 | 5/1963 | Borey | 34/57 A |
| 3,306,236 | 2/1967 | Campbell | 34/57 A |
| 3,495,654 | 2/1970 | Jacubowiez | 34/57 A |
| 4,097,243 | 6/1978 | Bartholic | 34/57 A |
| 4,287,156 | 9/1981 | DeFeo | 34/57 A |
| 4,335,662 | 6/1982 | Jones | 110/245 |
| 4,646,637 | 3/1987 | Cloots | 110/245 |
| 4,738,569 | 4/1988 | Comparato | 34/57 A |
| 4,860,694 | 8/1989 | Walker | 122/4 D |

OTHER PUBLICATIONS

"The Development and Practice of Cyclone Firing in Germany", by H. Seidl, A.S.M.E. and I.M.E. Joint Conference on Combustion, pp. 92–102, Jun. 1955, Boston, USA.

Primary Examiner—Henry A. Bennet
Assistant Examiner—Denise L. Gromada
Attorney, Agent, or Firm—Nikaido, Marmelstein, Murray & Oram

[57] ABSTRACT

An apparatus for powder falling type gas-solid contacting operation which comprises a hopper for feeding solid particles, a fluidizing bunker wherein the fed particles are fluidized by introduction of a fluidizing gas, a standpipe provided between the hopper and the bunker for feeding the particles from the hopper to the bunker, the lower end of the standpipe being located in the bunker, and a vertical gas-solid column connected to the bottom of the bunker for bringing the particles falling down from the bunker into contact with a gas countercurrently, in which a vertical tube is provided in the bunker so as to surround at least the lower end part of the standpipe and extend to a position below the lower end of the standpipe, whereby the height of the fluidized bed of the particles in the bunker is stably kept constant and the particles are fed from the bunker to the gas-solid column at a constant rate.

4 Claims, 1 Drawing Sheet

APPARATUS FOR POWDER FALLING GAS-SOLID CONTACTING OPERATION

BACKGROUND OF THE INVENTION

The present invention relates to an apparatus for contacting a particulate solid material with a gas. More particularly, the invention relates to an apparatus where a fluidized powder in a bunker is introduced into a vertical column or tower and falling powder is brought into contact with a gas therein.

Gas-solid contacting operation is industrially important for the purposes of gas-solid catalytic reaction, gas-solid reaction, drying of solid particles, modification of particle surface, etc. These operations are realized in various types of apparatus, i.e. fixed bed, moving bed and fluidized bed. In a fast fluidized bed, a powder and a gas flow upward cocurrently in a column at a high gas flow rate, whereas a powder is operated in batch wise in ordinary fluidized bed. On the other hand, a powder falling type gas-solid contactor has been known as a type of cyclone, and it has been used for the purposes of gas cleaning as reported in C. J. Stairmand, Trans. Inst. Chem. Eng., vol. 29, 15-44(1951) or N. Cherrett, J. Inst. Fuel, vol. 35, 245(1962), drying and burning of powder as reported in H. Seidl, A.S.M.E. and I.M.E. Joint Conf. Combust., USA Boston (June 1955), or smelting and reduction of ore as disclosed in U.S. Pat. No. 2,973,260 to Y. Nogiwa.

Since the powder can be used in a relatively dilute concentration in the fast fluidized bed and the powder falling cyclone type apparatus, they are advantageous, as compared to the ordinary dense phase fluidized bed, in terms of easy handling of a powder having poor flowability such as cohesive powder, or gas-solid contact time control. The powder falling type apparatus is especially convenient for low upward gas velocity operation.

In a powder falling type gas-solid contactor having features as mentioned above, powder charge and gas discharge at the top of the solid contact column and powder discharge and gas supply at the bottom of the column are essential operations, thus the powder is countercurrently contacted with the gas to achieve good performances of the gas-solid contactor. It is important to control adequately the feed and discharge of the solid and gas. As for the method of the powder feeding, gravitational falling from the bottom of a hopper type bunker to a column and mechanical feeders are known for the powder feeding. It is recently reported that the fluidization of the powder in the bunker by supplying a fluidization gas significantly enhances the powder discharge rate through an orifice provided at the bottom of the bunker [J.A.H. de Jong; "Vertical Air-Controlled Particle Flow from a Bunker through Circular Orifices", Powder Technology, Vol. 3, 279-286(1970)]. In this fluidization assisted operation, a constant powder discharge rate is maintained by keeping a steady fluidized bed height in the powder bunker. To keep the steady fluidized bed height, powder can be added to the fluidized bed from a hopper above the bed through a standpipe. In this method, it is also reported that the upper surface of the fluidized bed is kept at the same level as the lower end of the standpipe.

In the practical operation of the above mentioned powder falling gas-solid contacting method, several difficulties are encountered as follows: First, it is difficult to feed a powder from the hopper to the fluidized bed in the bunker through the standpipe so as to stably keep the height of fluidized bed at the same level as the lower end of the standpipe. The fluidized bed height often tends to increase to higher than the level of the bottom end of the standpipe, thus resulting in increase of the feed quantity of powder into a vertical gas-solid contacting column. If very narrow standpipe is used to regulate the excess powder supply, the height of the fluidized bed often decreases, thus resulting in decrease of the powder feed quantity. As a result of the change of fluidized bed height, the powder flow rate in the vertical gas-solid contacting column varies from time to time, thus a stable gas-solid contacting operation is impaired. Secondly, in the vertical gas-solid contacting column, the powder tends to fall through a relatively dense stream line beneath an orifice provided at the bottom of the fluidizing bunker rather than dispersing uniformly to all cross sectional area of the column. This uneven powder flow prevents the good contact between gas and solid as compared to the uniformly dispersed flow. Finally, the powder falling from the fluidized bed into the column always accompanies the fluidizing gas cocurrently. This makes it difficult to feed a contacting gas countercurrently, thus the gas-solid countercurrent contacting efficiency is lowered.

SUMMARY OF THE INVENTION

The present inventors have found that the height of the fluidized bed in the powder bunker can be stably kept constant by providing in the powder bunker a vertical tube which surrounds at least a lower part of the standpipe for feeding a solid powder from the hopper to the bunker and which extends to the fluidized powder bed, thereby suppressing the fluidization of the powder present near the lower end of the standpipe.

In accordance with the present invention, there is provided an apparatus for powder falling type gas-solid contacting operation which comprises a hopper for feeding solid particles, a fluidizing bunker wherein the fed particles are fluidized by introduction of a fluidizing gas, a standpipe for feeding the particles from said hopper to said bunker, the upper end of said standpipe being connected to the bottom of said hopper and the lower end being located in said bunker, and a vertical gas-solid contacting column which is connected to the bottom of said bunker and in which the particles falling down from the bottom of said bunker are brought into contact with a contacting gas fed from the lower part of said column, said apparatus being characterized in that a vertical tube having a larger diameter than said standpipe is provided in said bunker so as to surround the periphery of said standpipe, said vertical tube extending to a position lower than the lower end of said standpipe, having an opening at the side of its lower end part and communicating with the space over the fluidized powder layer in said bunker.

In the practice of the gas-solid contacting apparatus of the present invention, solid particles such as powder are fed from the hopper to the fluidizing bunker through standpipe, and while the fed particles form a fluidized bed by a gas fed into the bunker, they fall down from the bunker through the vertical column where they contact a gas fed from the lower part of the column. Since the vertical tube communicating with the space over the fluidized bed is provided in the bunker so as to surround the area around the lower end of the standpipe inserted into the bunker, fluidization of the particle layer is restrained at the area near the lower end of the standpipe, and as a result, excess feeding of the particles from the standpipe is prevented, thus the height of the fluidized bed in the bunker is maintained constant.

DETAILED DESCRIPTION

Figure 1:
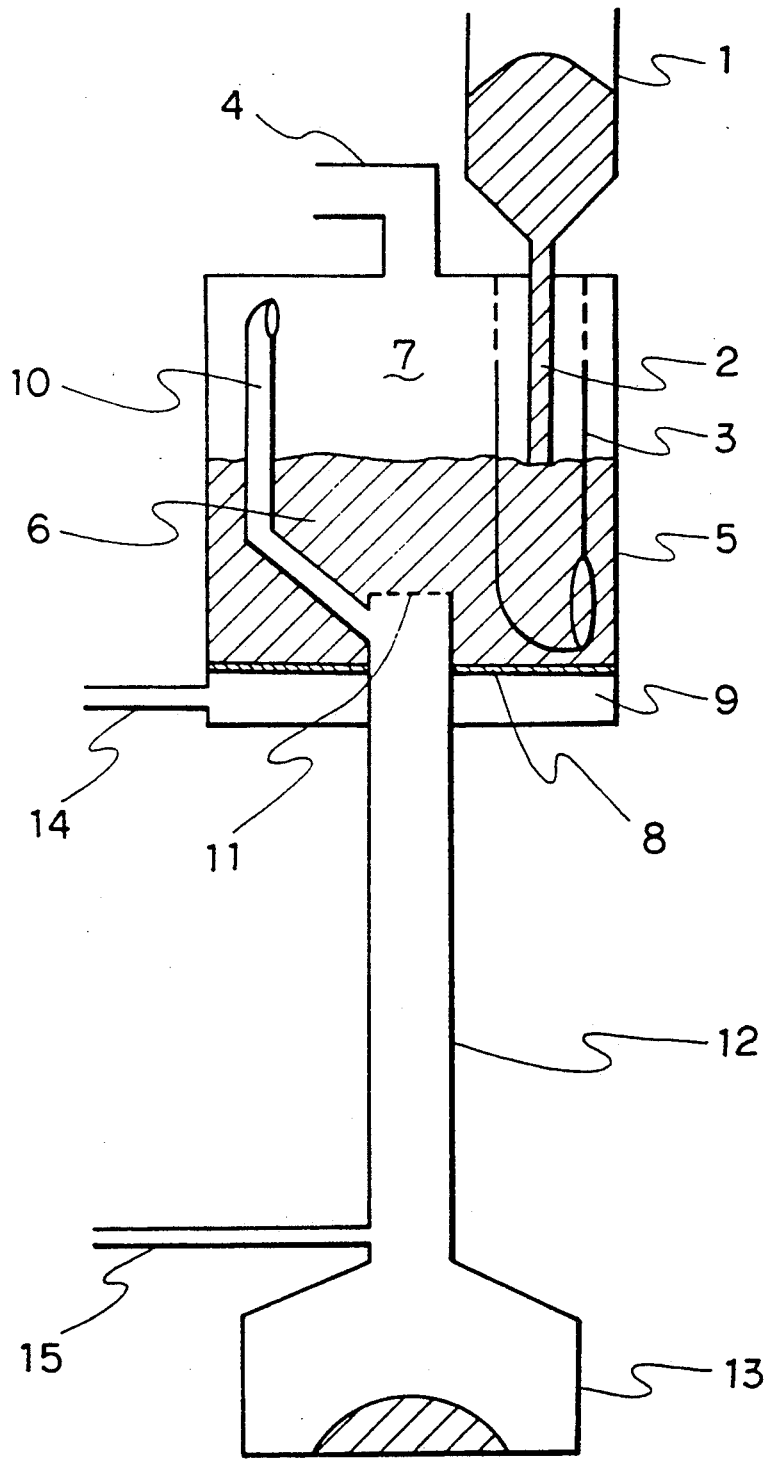
FIG. 1 is a schematic section view showing an embodiment of the apparatus of the present invention.

Referring to FIG. 1, the apparatus of the invention comprises three parts, hopper 1 for feeding a solid powder, fluidizing bunker 5 and powder falling column 12 for gas-solid contacting.

Among these three parts, the hopper 1 is situated at the highest level so that the powder in the hopper can move down to the bunker 5 by the gravimetric effect through the standpipe 2 connected to the bottom of the hopper. The variation of the amount of powder in the hopper has no significant effects on the powder feeding rate, although the hopper should not be permitted to empty during operation. For example, by making volume of the hopper larger than that cf fluidizing powder, the amount of powder in the hopper is maintained without any difficulty. A funnel shaped bottom of the hopper, e.g. bottom inclined at an angle of about 30°-70°, can help a smooth powder supply, avoiding a stagnant zone in the bottom of the hopper.

A vertical standpipe 2 is connected to the bottom of the hopper 1 through which the powder is supplied to the fluidizing bunker 5. The length of the standpipe is determined so that its lower end is positioned at the level of the upper surface of the fluidized bed 6 of the powder in the bunker 5, that is, at the level corresponding to the predetermined height of the fluidized bed 6. The diameter of standpipe 2 is selected so that the powder moving velocity in the pipe is within the range of 0.1 to 10 cm/sec.

Fluidizing bunker 5 is located under the hopper 1, connecting to the top of powder falling column 12. A gas for fluidization of the powder in the bunker 5 is fed to the bottom portion of the bunker through feed pipe 14 connected thereto. The fluidization of the powder layer can be achieved by various means. For example, the fluidizing gas may be fed into the powder layer through a nozzle or nozzles arranged at the bunker bottom, or it may be fed from gas chamber 9 through a gas-permeable partition plate 8 provided at the bottom portion of the bunker 5 to form the gas chamber 9. The latter method is preferable, since it easily enables uniform fluidization throughout the bed as compared with the gas feed through a single nozzle or nozzles. A sintered plate having gas permeability is preferable as the partition plate 8. An empty space 7 should be prepared in the upper part of the bunker 5, namely over the fluidized bed 6, in order to settle down the flying powder. Cyclone may be applied to this space 7 in order to help the separation of powder from the gas to be discharged. Gas discharge line 4 is provided at the upper part, e.g. top, of the bunker 5, and through which the fluidizing gas and a gas fed for gas-solid contacting are discharged outside the apparatus. The volume of the bunker 5 is determined to have an average powder residence time of at least about 10 minutes, in order to achieve a stable operation.

Powder falling column 12 for gas-solid contacting is connected to the bottom of the bunker 5 vertically. The upper part of column 12 may be projected into the bunker 5 so that its upper end is located at the same or higher level than the level of introducing the fluidizing gas, but it should of course be avoided to project over the fluidized bed 6. For example, in the case where partition plate 8 is provided in order to form gas chamber 9 at the bottom part of bunker 5, powder falling column 12 is connected to the bottom of bunker 5 so that the upper end of column 12 is positioned over the partition plate 8. The height of the column 12 is determined in accordance with the objective operation so that the falling powder has an appropriate residence time in the column to achieve the desired treatment. The diameter of the column 12 is determined based on the required production rate. Falling powder receiver 13 is attached to the lower end of the column 12. The gas to be contacted with the falling powder is introduced from the lower part of the column 12 through feed pipe 15 for the contacting gas. To maintain an appropriate operation temperature, if required, heat supply or heat removal can be done through the column wall, or by adjusting the temperature of the contacting gas or fluidizing gas to be fed. In the case where light irradiation to the powder from an outside light source is required, the column 12 can be made of a light transmissible material, e.g. glass, transparent plastics or other transparent materials.

A characteristic feature of the present invention is the application of vertical tube 3 surrounding the standpipe 2, whereby the fluidization of the powder present in the vicinity of the lower end of the standpipe is restrained, and consequently the powder is stably fed from the hopper and the height of the fluidized bed 6 of the powder in the bunker 5 is maintained stably at the level of the lower end of standpipe 2. As a result, the powder is fed stably from the fluidized bed 6 into the column 12 at a constant rate. This vertical tube 3 has a larger diameter than the standpipe 2, and has a length such that it surrounds the periphery of at least the lower end portion of standpipe 2 and extends below the lower end of the standpipe. Preferably, vertical tube 3 surrounding standpipe 2 is attached vertically to the ceiling of bunker 5, extending to near the bottom of bunker 5. The bottom of vertical tube 3 is closed, but at the side of the lower end portion of vertical tube 3, it has an opening having a size equal to or larger than its horizontal sectional area, through which the powder fed from the standpipe inserted into the tube 3 is sent to the fluidized bed. The upper part of vertical tube 3 has an opening or openings so as to communicate with the space 7 over the fluidized bed, thereby preventing the fluidizing gas from entering into hopper 1.

Preferably, in order to raise the gas-solid contacting efficiency, perforated plate 11 for powder falling is mounted on the top of powder falling column 12 which is the inlet for the falling powder into the column 12 from bunker 5. The perforated plate 11 has a plurality of holes. The hole size of the perforated plate is preferably within the range of about 5 to about 30 times the average particle size of the powder to be treated. The number of holes is determined according to the desired powder feeding rate. Uniform distribution of the powder in the powder falling column 12 can be achieved by, as mentioned above, horizontally mounting the perforated plate on the top end of the column to cover the whole cross section of the column. When the hole size of the perforated plate is less than 5 times the average particle size, the powder cannot be supplied into the powder falling column upon the practical operation. When the hole size is more than 30 times the average particle size, the powder continues to fall down by only its gravity even if the fluidizing gas is not fed to the bunker 5. When the hole size is selected from the range of 5 to 30 times the average particle size, it is possible to cause the powder to fall down in a good state by feeding a gas to the bunker 5 for fluidization, and it is possible to stop the falling of powder by stopping the feeding of the fluidizing gas, namely by stopping the fluidization.

Preferably, in order to discharge the contacting gas flowing upward through the powder falling column 12, the contacting gas is led to the space 7 in the upper part of the bunker 5 through contacting gas discharge pipe 10 which is attached to the side of the upper end part of the column 12 at the position below the perforated plate 11 and which is extended to the space 7. Since the upper end of the contacting gas discharge pipe 10 is not led directly to the outside of the bunker 5, but to the space 7 in the bunker 5, a certain amount of powder accompanying the contacting gas is prevented from being discharged outside the bunker with the gas. It is preferable that the pipe line from the side of the column top has a slope of high angle in order to prevent the pipe 10 from choking with the accompanying powder. It is also preferable that the discharge pipe 10 has an opening as the outlet in the side wall of the upper end portion, not an upward opening, without forming a horizontal portion in order to avoid accumulation of the powder at the outlet. Further, when the fluidizing bunker 5 has a cylindrical shape, separation of the accompanying powder from the contacting gas to be discharged outside the apparatus is facilitated by arranging the outlet opening toward the circumferential direction of the bunker 5, so as to blow off the gas out of the opening along the wall of bunker 5 in the space area.

The present invention is more specifically described and explained by means of the following Examples.

EXAMPLE 1

An apparatus as shown in FIG. 1 was assembled, and a gas-solid contacting operation was conducted using the apparatus.

(Apparatus)

A standpipe having an inner diameter of 2 cm and a length of 20 cm was connected to the bottom of a hopper composed of the upper cylindrical part having an inner diameter of 10 cm and a height of 30 cm and the bottom funnel part having an inclination of 45°. A fluidizing bunker was in the shape of a cylinder made of a transparent plastic having an inner diameter of 20 cm and a height of 35 cm. The bunker had a total gas discharge pipe having a diameter of 5 cm at its top. A sintered metal plate having a thickness of 5 mm was horizontally fixed to the bottom part of the bunker at a height of 5 cm from the bottom to form a gas chamber. The bunker was also provided with a pipe for feeding a fluidizing gas to the gas chamber.

The standpipe was inserted from the top of the bunker, and a vertical tube having a diameter of 5 cm, which had an opening in the wall of the lower end part and had holes communicating with the upper space of the bunker in the wall of the upper part, was attached to the bunker so as to surround the inserted part of the standpipe. The vertical tube had a length of 28 cm, and its lower end was positioned near the bottom of the bunker.

A transparent glass tube having a diameter of 5.3 cm and a length of 90 cm was vertically attached as the powder falling column to the bottom of the bunker at the center position of the sintered plate provided in the bottom part of the bunker so that the upper end part of the glass tube projected over the sintered plate. The height of the projected part between the sintered plate surface and the top end of the column was 5 cm. A contacting gas discharge pipe having a diameter of 2 cm was upwardly connected at an inclination of 45° to the side face of the projected part of the powder falling column, and its upper end was led to the space in the upper part of the bunker. A perforated plate having 9 holes of 1.5 mm diameter arranged at 1 cm square pitch was fixed onto the top end of the powder falling column. Also, a contacting gas feed pipe and a falling powder receiver were attached to the lower end part of the powder falling column.

(Gas-solid contacting operation)

A polyvinyl chloride powder having an average particle size of 140 $\mu$m and a density of 1.06 g/m: was mannually charged into the hopper, thus introducing the powder into the bunker. Air was fed as the fluidizing gas from the fluidizing gas feed pipe to the gas chamber at a velocity of 35 $\mu$/minute, and air was fed as the contacting gas from the contacting gas feed pipe to the powder falling column at a velocity of 100 $\mu$/minute.

By the start of the air feeding, the powder in the bunker was fluidized in a good state, keeping the height of the fluidized bed at the same level as the lower end of the standpipe, and it entered into the powder falling column. The powder which had passed through the perforated plate, dispersed to the entire cross sectional area of the column without forming an uneven powder flow line. Also, no powder accompanying the discharged gas was detected in the total discharge gas discharged from the top of the bunker. The operation was continued for 30 minutes with adding the powder to the hopper from time to time, and thereafter, the operation was finished by stopping the feeding of the fluidizing gas. During the operation, the fluidized bed in the bunker was always kept at a constant height, thus a stable feeding of the powder into the powder falling column was ensured.

Comparative Example 1

The gas-solid contacting operation was conducted in the same manner as in Example 1 using the same apparatus except that the vertical tube surrounding the standpipe was detached.

By feeding the fluidizing gas, the powder in the bunker was fluidized with keeping the bed height at the same level as the lower end of the standpipe in the initial stage of the operation, thus the same gas-solid contacting state as in Example 1 was obtained. Thereafter, however, the powder in the hopper flowed down in excess into the bunker through the standpipe, so that the height of the fluidized bed gradually increased to a higher level than the lower end of the standpipe, and as a result, the feed rate of the powder into the powder falling column through the perforated plate increased with the increase of the bed height.

From the above results, it is apparent that it is difficult to maintain the flow rate of the falling powder constant when the vertical tube is not provided, thus a stable gas-solid contacting operation is difficult.

Comparative Example 2

The gas-solid contacting operation was conducted in the same manner as in Example 1 using the same apparatus except that an orifice plate having a single hole of 5 mm in diameter at its center was used instead of the perforated plate.

The powder could be stably supplied to the powder falling column, but the powder fell down from the orifice through a vertical dense stream line. No uniformly dispersed flow of the falling powder in the column was obtained.

Also, after stopping the feed of fluidizing gas, the powder in the bunker still continued to fall down by gravitational force.

From the above results, it is understood that the use of an orifice having a large size instead of a perforated plate with small holes is not efficient for gas-solid contacting because of poor dispersion of the falling powder, and that it is difficult to control the starting and finishing of gas-solid contacting operation by means of starting the feeding of the fluidizing gas and stopping the feeding.

Comparative Example 3

The gas-solid contacting operation was conducted in the same manner as in Example 1 using the same apparatus except that the upper end of the contacting gas discharge pipe was led directly to the outside of the bunker instead of leading to the space in the upper part of the bunker.

The operation could be made in a similar state to Example 1, but a part of the powder was discharged outside the apparatus with the gas.

Although the apparatus of the present invention has been described and explained with reference to particular embodiments, it is to be understood that various changes and modifications may be made in the invention without departing from the scope thereof.

What we claimed is:

1. An apparatus for powder falling type gas-solid contacting operation which comprises a hopper for feeding solid particles, a fluidizing bunker wherein the fed particles are fluidized by introduction of a fluidizing gas, a standpipe for feeding the particles from said hopper to said bunker, the upper end of said standpipe being connected to the bottom of said hopper and the lower end being located in said bunker, and a vertical gas-solid contacting column which is connected to the bottom of said bunker and in which the particles falling down from the bottom of said bunker are brought into contact with a contacting gas fed from the lower part of said column, said apparatus being characterized in that a vertical tube having a larger diameter than said standpipe is provided in said bunker so as to surround the periphery of said standpipe, said vertical tube extending to a position lower than the lower end of said standpipe, having an opening at the side of its lower end part, with the vertical tube communicating with the space over the fluidized particle layer in said bunker.

2. The apparatus of claim 1, wherein a perforated plate having a plurality of holes is mounted on the top end of the gas-solid contacting column, said holes having a diameter of 5 to 30 times the average particle size of the particles to be fed.

3. The apparatus of claim 1, wherein the upper end part of the gas-solid contacting column is projected into the fluidizing bunker, and to the side of said upper end part is connected a discharge pipe for discharging the contacting gas from the column top, said discharge pipe extending to the space in the upper part of said bunker.

4. The apparatus of claim 1, wherein a gas-permeable partition plate is horizontally provided at the bottom part of the bunker to form a gas chamber, and to the gas chamber is connected a feed pipe for feeding the fluidizing gas to the bunker through the partition plate.

* * * * *